United States Patent [19]

Ferruti et al.

[11] 4,166,902

[45] Sep. 4, 1979

[54] HIGH POLYMERS CONTAINING NICOTINIC ACID, PROCESS FOR THEIR PREPARATION AND THEIR USE

[76] Inventors: Paolo Ferruti, V.le Cassiodoro, 24; Rodolfo Paoletti, V.le Regina Margherita, 43, both of Milan, Italy

[21] Appl. No.: 867,889

[22] Filed: Jan. 9, 1978

Related U.S. Application Data

[63] Continuation-in-part of Ser. No. 622,442, Oct. 14, 1975, Pat. No. 4,067,876.

[30] Foreign Application Priority Data

Oct. 14, 1974 [IT] Italy ................................ 28420 A/74

[51] Int. Cl.$^2$ .............................................. C08F 31/02
[52] U.S. Cl. ....................................... 536/48; 424/180
[58] Field of Search ........................... 424/180; 536/48

[56] References Cited

U.S. PATENT DOCUMENTS 4,067,876   1/1978   Ferruti et al. ...................... 526/23

*Primary Examiner*—Melvyn I. Marquis
*Attorney, Agent, or Firm*—Stevens, Davis, Miller & Mosher

[57] ABSTRACT

New polymers consisting of a macromolecular structure of soluble starch to which 15–30% of nicotinic acid radicals are bound through covalent ester bonds. These polymers are gradually hydrolized in biological environment by setting free nicotinic acid and non toxic polysaccharide residues. These polymers have a therapeutic activity similar to that of nicotinic acid, but by far more long lasting and devoid of collateral effects.

5 Claims, 3 Drawing Figures

PLASMA FFA LEVELS

FIG. 1

PLASMA LEVELS OF NICOTINIC ACID AND P61

FIG. 2

FIG.3

HIGH POLYMERS CONTAINING NICOTINIC ACID, PROCESS FOR THEIR PREPARATION AND THEIR USE

This is a Continuation-in-part of Application Ser. No. 622,442 filed Oct. 14, 1975 now U.S. Pat. No. 4,067,876.

The present invention is concerned with new polymers, the characteristic of which is the presence of radicals of nicotinic acid bound to a polymeric matrix in such a way that they are hydrolized and they can form free nicotinic acid in a biological environment.

More exactly, this invention refers to high polymers containing radicals of nicotinic acid bound to the macromolecular matrix through ester or amide bonds that are hydrolized gradually in a biological environment.

It is known that nicotinic acid has assumed great importance in human therapy in these recent years as an agent capable of decreasing the cholesterol content as well as the free fatty acids content in the blood plasma, and also as a vasodilatator agent capable of efficiently curing serious form of arteriosclerosis.

However, it was found that the use of nicotinic acid causes serious troubles that are essentially due to the velocity at which this acid is metabolized which has led to the necessity that it be administered frequently up to a total daily dose of 3 to 6 grams. Usually this very high dose of nicotinic acid causes irritation to the gastric mucous membrane, or redness in general due to vasodilatation, or—as has happened in a significant number of patients—it provokes liver troubles in different degrees. Although these troubles disappear as soon as the treatment is interrupted, when they appear, it is recommended in general to stop the therapy.

We have now found that it is possible to prepare polymers containing certain percentages of radicals of nicotinic acid that are hydrolyzed only gradually in a biological environment, thus permitting maintenance for a long period in the body pre-determined and constant quantities of nicotinic acid by only one administration. By so doing it is no longer necessary to frequently administer high doses of nicotinic acid of which only a very small portion is used in the body, whereas most of it is metabolized; consequently all collateral effects, that are undesired and connected with this kind of administration, are avoided.

Although in concept the solution to the problem as we found it seems plain in itself, it is instead in practice extremely difficult to find polymers: that have absolutely no toxicity; that are not metabolized, or that produce metabolites that in their turn are absolutely non toxic; and that form, with the radicals of nicotinic acid bonds that in a biological environment are only gradually hydrolyzed over the length of time desired.

Up to this moment we have found three classes of polymers that possess these characteristics; we also found that the only types of bonds between nicotinic acid and macromolecular structures capable of hydrolyzing in the way desired are the bonds of the ester or amide type.

These are the classes of polymers we have found:

A—Vinylic or vinylidenic polymers to which proper side chains are bound that contain free hydroxyl or amino group capable of reacting with nicotinic acid. Preferably the fundamental polymeric structure consists of polyacrylamide or polymethacrylamide, polyacrylic or polymethacrylic acid, whose nitrogen atom is mono-substituted with hydroxyalkylic chains, aminoalkyllic chains or hydroxyaminoalkylic chains.

The terminal hydroxy or amino groups of these chains have reacted with nicotinic acid that is thus bound to the macromolecular matrix through ester or amide bonds.

Characteristic polymers belonging to this class are shown below:

I

II

III

IV

V where n is included between 10 and 5.000.

Homopolymers of types I, II, III, IV and V swell but are not water-soluble; therefore they are suitable only for certain kinds of administration.

In principle it is, however, always preferable to have water-soluble polymers.

To obtain polymers of the above kind that are water-soluble although they maintain all activity and toxicity characteristics unchanged, we have prepared co-polymers containing, besides the units of polymers I, II, III, IV and V, also varying percentages of units that are markedly hydrophilic, such as for example those deriving from 1-acryloyl-4-methylpiperazine (VI), N-acryloyl morpholine (VII) and N-vinyl-pyrolidone (VIII):

VI

VII

VIII

Homopolymers and co-polymers belonging to this class can be prepared by applying various methods which include:

(a) preparation of the fundamental polyvinyl structure on which later the units are grafted that carry the amino and hydroxylic groups able to react with nicotinic acid and then reaction with nicotinic acid;

(b) preparation of monomers consisting of the vinyl units and of the units carrying the amino and/or hydroxylic reactive groups; homo-polymerisation of these monomers or their co-polymerisation with the hydrosolubilizing units and finally reaction of the polymer obtained with nicotinic acid or one of its proper derivative;

(c) preparation of monomers consisting of the vinyl unit, of the unit carrying the amino and/or hydroxylic groups that are capable of reacting with nicotinic acid, and of the nicotinic acid itself, followed by homo-polymerisation of the monomers obtained or their co-polymerisation with the hydrosolubilizing units.

However, we have found that the method preferred when preparing the polymers of formulae I, II, III, IV and V under mild reaction conditions and with nearly quantitative yield, consists in carrying out a radicalic polymerization of vinyl compounds containing activated amide or ester groups, in having the polymer so obtained react with a proper diamine, hydroxyalkylamine or alkylen-glycol and finally in having the free amino or hydroxyl present at the end of the side chains existing on the polymer react with a proper activated derivative of nicotinic acid.

The vinyl compounds most suitable for forming the macromolecular fundamental structure carrying the necessary activated groups are: 1-acryloyl benzotriazole; 1-acryloyl methoxybenzotriazole; 1-acryloyl methylbenzotriazole; 1-acryloyl imidazolide; N-acryloyl-succinimide; N-2,4,5-trichlorophenyl acrylamide.

Hydroxy and/or amino-compounds capable of reacting with the activated groups existing on the polyvinyl chain are preferably selected from the group comprising: ethanolamine, N,N-bis(2-hydroxyethyl)-1,3-propandiamine, ethylenediamine, ethylene glycol.

The preferred reactive derivatives of nicotine acid, are: nicotinoyl chloride; nicotinoyl chloride hydrochloride; nicotinoyl imidazole; ethyl nicotinate.

Water-soluble co-polymers are prepared in quite a similar way as described for the homopolymers: in the first polymerization stage, instead of polymerizing only the activated derivatives of acrylamides, a mixture is polymerized containing the desired percentage of lyophilizing monomers preferably selected from the group consisting of 1-acryloyl-4-methylpiperazine, N-acryloyl morpholine, N-vinylpyrolidone.

Polymerization obviously is always of the radical type.

Polymers of type V, in which the fundamental structure is methacrylic, are instead preferably prepared by having alkylendiamine or hydroxyalkylenamine react with a proper derivative of nicotinic acid, preferably ethyl nicotinate; the N-nicotinoyl alkylenamine thus obtained is made to react with a reactive methacryloyl derivative, preferably with methacryloyl chloride.

In a particular case where use is made of ethylendiamine in the said way it is possible to obtain, for example, monomeric units the formula These monomeric units can be homopolymerized or co-polymerized with lyophilizing units of the type above mentioned in the presence of radical initiators.

B—Polyamide-amino structured polymers to which proper side chains are bound that carry hydroxylic groups esterified with nicotinic acid.

Polymers of this type are obtained by having bis-acrylamides which may be bis-acryloyl piperazine or bis-acrylamides having the formula:

(where n=1–6 and $R_1$ and $R_2$ being the same or different=hydrogen or alkyl radicals with 1–6 carbon atoms) reacted with hydroxyalkylmonoamines or hydroxyalkyldiamines having the formula:

$$R_1-NH-(CH_2)_n-NH-R_2$$

(where $R_1$ and $R_2$ being the same or different are hydroxyalkyl groups and n=1–6).

The reaction is carried out at temperatures in the range of 10° to 50° C. and preferably in the presence of an inert solvent.

The polymers so obtained are made to react with nicotinoyl chloride, nicotinoyl chloride hydrochloride or with nicotinoylimidazole that esterify the free hydroxyls thus forming the polymers containing nicotinoyl radicals, according to the invention.

Characteristic polymers, according to this invention, are, for example:

IX

X where n is included in the range from 5 to 1000 and which are obtained by reaction with nicotinoyl chloride hydrochloride or with nicotinoylimidazole of the products obtained from polyaddition of 1,4-bis-acryloylpiperazine and N,N'-bis (2-hydroxyethyl) ethylenediamine or ethanolamine. Polymers of this class can be water-soluble or water-insoluble. In the latter case it is always possible to make them water-soluble by co-polymerisation with monomeric lyophilic units.

C—Polysaccharides obtained from dextrans of various origin and molecular weight, the free hydroxyls of which are esterified in whole or in part with nicotinic acid.

Polysaccharides to be used for preparing the polymers according to the invention can obviously be obtained by application of any known method. Their molecular weight is in the range of from 5,000 to 50,000. These polysaccharides can be esterified in whole or in part with reactive derivatives of nicotinic acid, such as nicotinoyl chloride, nicotinoyl chloride hydrochloride, nicotinoylimidazole.

Alternately, to obtain polysaccharides only partially nicotinized, polysaccharides that are totally nicotinized can be partially hydrolysed. Polysaccharides which are particularly useful for preparing the new polymers according to the present invention are those comprised under the common name of "soluble starch". Soluble starch is any starch having a polymerization degree (numeral mean value) comprised between 150 and 2500, having a percentage of amylose in the range 15–35% and a percentage of amylopectina in the range 85–65%.

Such starch is soluble with heating in formamide and DMSO.

The polymers of classes A, B, C, according to this invention, have application in all the fields of human therapy where use is made of nicotinic acid, and the results that can be reached are therapeutically much more valuable without any undesired side-effect.

With the view to make the importance of the new invention more evident, we give below some significant pharmacological data.

The experiment whose results are reported was run on rats having an average weight of 250 g; they were kept hungry for 48 hrs so as to artificially increase the free fatty acids rate in the blood. Rats were divided into three groups, one of which was the reference group, another was treated orally with 200 mg/kg of nicotinic acid (this is considered the maximum dose for nicotinic acid beyond which serious collateral effects occur); the other was orally treated with a quantity of polymer prepared according to Example 1, equivalent to 400 mg/kg of nicotinic acid.

|  | 1h | 2 hrs | 6 hrs | 16 hrs | 24 hrs |
|---|---|---|---|---|---|
| Controls | 0.425 |  | 0.772 |  | 1.346 |
| Nicotinic acid | 0.303 | 0.375 | 0.720 | — | — |
| Polymer | 0.342 | 0.336 | 0.280 | 1.341 | 1.221 |

The quantity of free fatty acids in the blood plasma, expressed as $\mu$Eq/ml, was determined at the times indicated.

It is clear that while after one hour and after two hours the free nicotinic acid and the nicotinized polymer cause a drop almost equivalent in the free fatty acids level in the plasma (which means that during this time about 50% of the nicotinic acid, equal to 200 mg/kg, has been hydrolyzed from the polymer), after six hours the nicotinic acid is completely metabolised, thus it does not give any protection any more, whereas the polymer reaches the maximum of its efficiency; this is likely due to an additional gradual hydrolysis of the nicotinic acid bound to it.

On an additional check run after 16 and 24 hours it was shown that at these limits of time all of the nicotinic acid bound to the polymer is already hydrolyzed and metabolized; it cannot, therefore, give any protection. The animals treated with the nicotinized polymer do not show any sign of any undesired collateral effect.

In conclusion, it is clear from this experiment that with the new polymers it is possible to extend from 2 to at least 6 hours the protection furnished by the nicotinic acid by only one administration, without any undesirable collateral effect, because the so freed nicotinic acid evidently never exceeds the maximum dose tolerated by the body.

Another experiment was run on rats weighing on an average 250 g each, but this time the free fatty acid increase in the blood was induced by administering nor-adrenaline (NA).

Rats were divided into four groups: one as reference group; another was treated with NA only; another group was treated with NA and after 30' with 800 mg/kg of free nicotinic acid; a group was treated with NA and after 30' with a quantity of the polymer of Example 1, equivalent to 800 mg/kg of nicotinic acid.

After 8 hours from NA administration, the animals were sacrificed and the free fatty acid rate in the blood determined.

By expressing such rate as $\mu$Eq/ml these values are found:

Controls; 0.370
NA; 0.768±0.032
Nicotinic acid; 0.836
Polymer; 0.526±0.030

From these data it is clear that even with extremely high doses of nicotinic acid it is impossible to maintain the fatty acid rate in blood plasma within the desired limits because, evidently, after a certain time it is anyhow metabolized. It is clear, instead, that after 8 hours the nicotinized polymer acts still considerably by dropping very much the content of free fatty acids.

Another set of pharmacological tests was performed using the polymer of Example 9 (P61) in comparison with free nicotinic acid.

This polymer P61 showed a greatly prolonged activity after a single oral administration.

Figure 1:
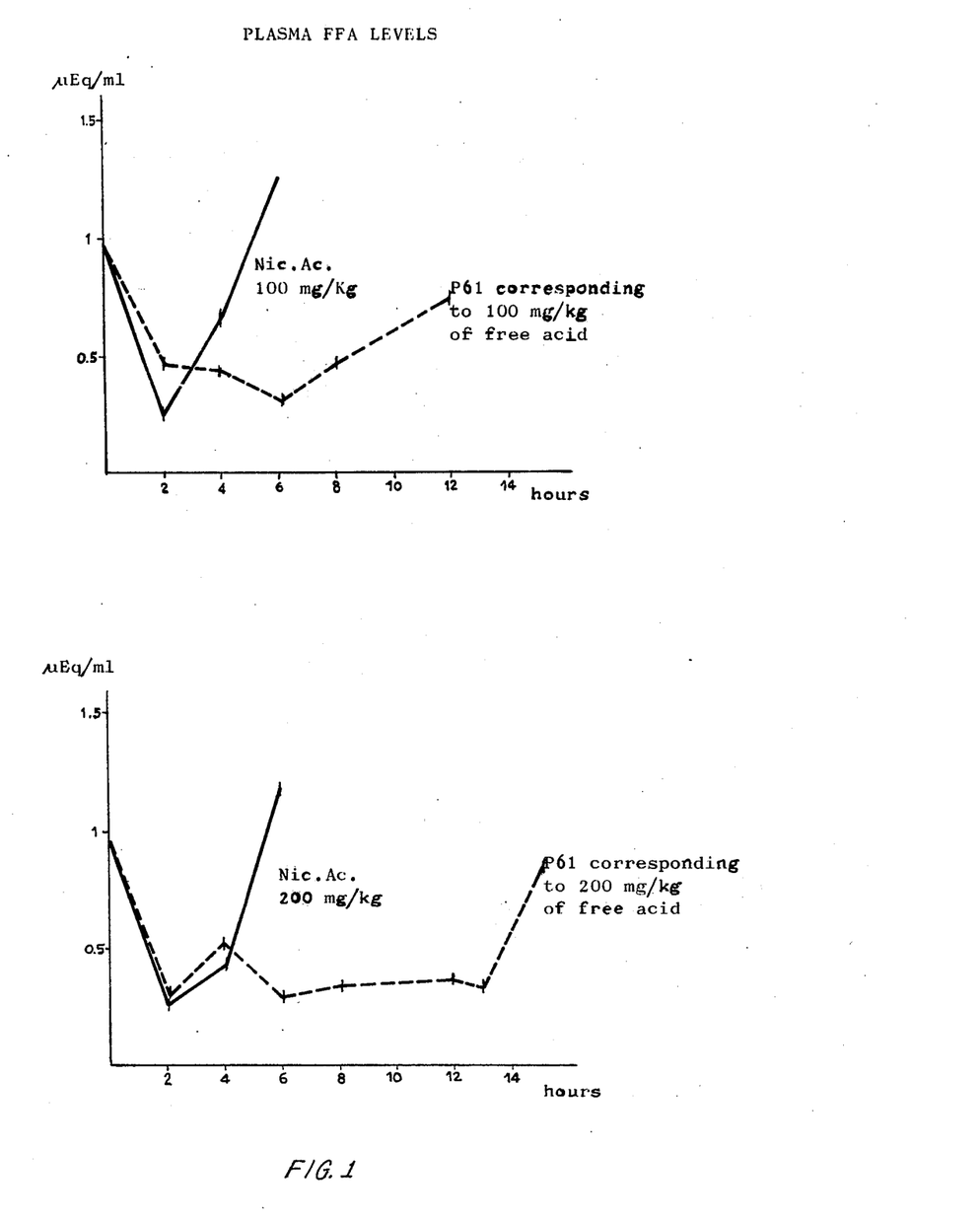

Thus, while at the doses of 100 mg or 200 mg/kg, free nicotinic acid (NA) reduces plasma free fatty acid (FFA) level only for 2–4 hours, with the corresponding doses of NA bound to the polymer, this effect lasts for 9 to 13 hours respectively according to the doses administered (FIG. 1).

Figure 2:
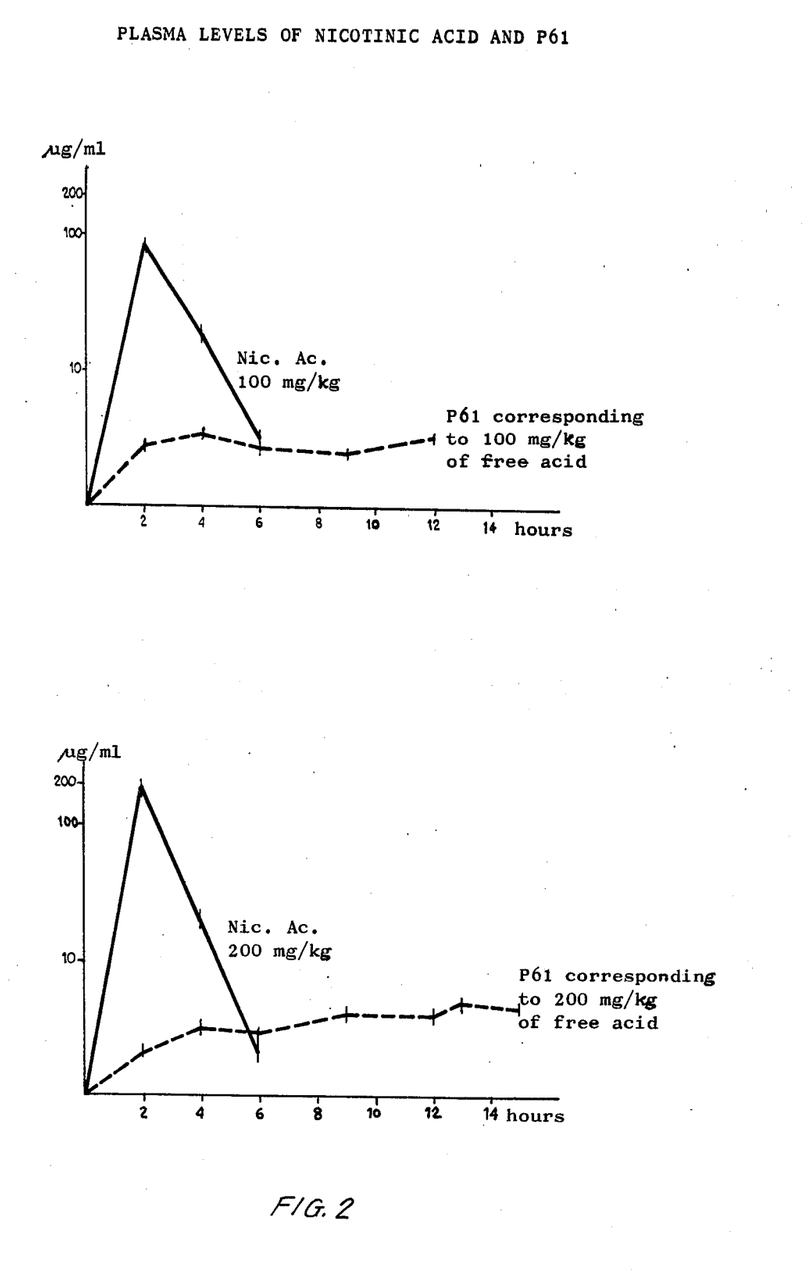

The NA effect is followed by a distinct rebound (1.193 versus 0.959 Eq/ml). On the contrary, the P61 action is not followed by the overshoot phenomenon. It is of interest to note that after free NA administration, NA plasma level is very high at 2 hours and it rapidly declines. On the contrary, the P61 treated animals never showed high plasma levels of NA, but rather a prolonged steady state, sufficient to sustain the antilipolytic activity. These data are summarized in FIG. 2 where it is possible to observe that there is a good agreement between the very high plasma NA levels and the peak of its antilipolytic activity at 2 hours. On oral administration, therefore, nicotinic acid, although rapidly absorbed, was also rapidly eliminated from the blood. The P61 results, on the other hand, indicate that even a small increase of the content of free NA in the blood was combined with almost maximal pharmacological effect.

In order to show that the use of the polymer P61 is never accompanied by toxic effects or by undesired side-effects, a number of specific tests have been performed.

Figure 3:
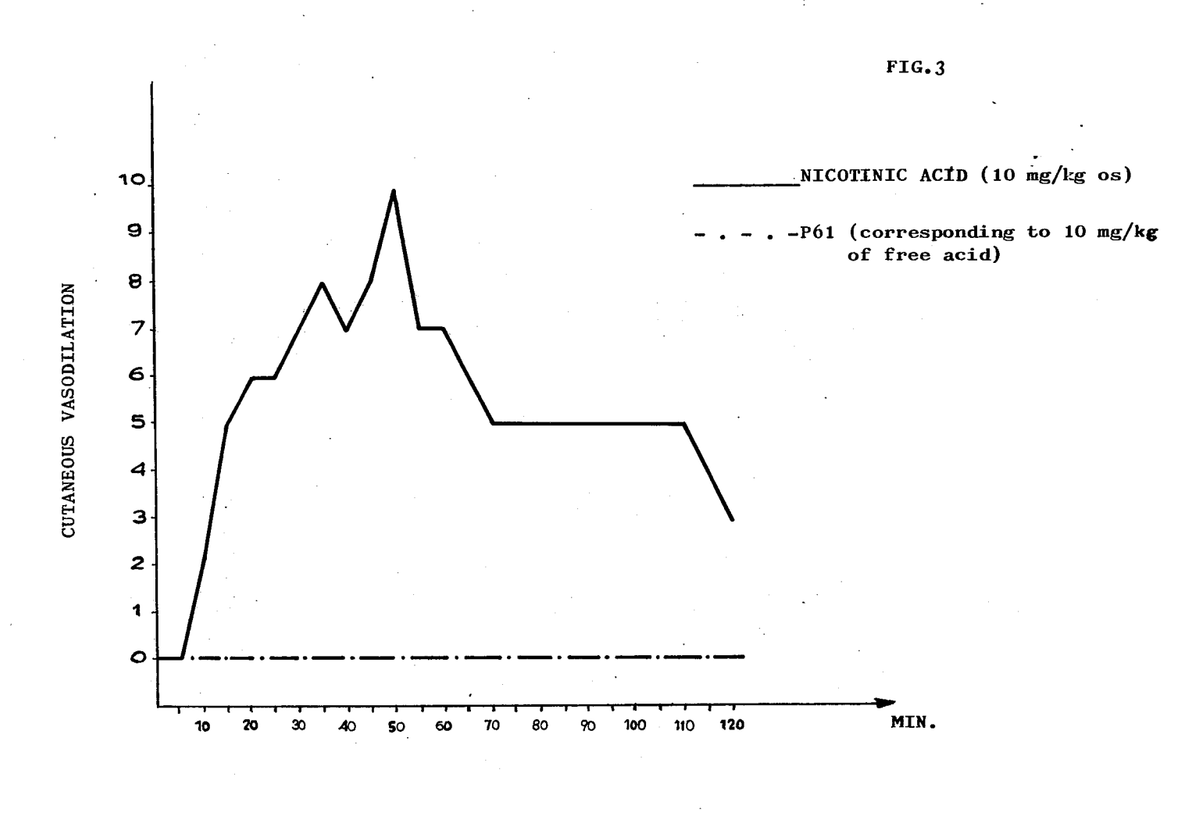

The flushing effect due to cutaneous vasodilatation was evaluated by measuring the cutaneous vasodilation of the ear lobe in the guinea pig. The results obtained are summarized in FIG. 3 wherefrom it appears that after five minutes of oral administration of free NA, the flushing rapidly appears and reaches its peak in about one hour, there it diminishes gradually until 2 hours and more. The polymer P61, instead, in completely void of this side effect. To demonstrate that the macromolecular backbone of the polymer P61 is free of antilipolytic action, the FFA lavel was measured in rats subjected to fasting-induced lipolysis. From the results summarized in the following table, it is clear that the soluble starch which is the backbone of P61, has no lipolytic effect at all Effect of the P61 backbone on fasting-induced lipolysis in rats.

| Conditions | FFA μEq/ml ± E.S. |
|---|---|
| Control | 1.011 ± 0.120 (10) |
| 2 hrs | 0.976 ± 0.086 (10) |
| 4 hrs | 1.122 ± 0.105 (10) |
| 6 hrs | 0.998 ± 0.117 (10) |

In brackets the number of animals.

Another test was performed to demonstrate that the polymer P61 does not induce any modification of glucose plasma levels.

The results, which just confirm the above, are collected in the following table

Effect of P61 on blood glucose in rats.

| Conditions | Glucose mg/100 ml ± E.S. |
|---|---|
| Control | 59.80 ± 3.74 (10) |
| 2 hrs | 74.35 ± 4.17 (10) |
| 4 hrs | 79.4 ± 4.37 (10) |
| 6 hrs | 58.82 ± 3.98 (10) |

In brackets the number of animals

The results of experiments performed to evaluate the effect of P61, in comparison with free nicotinic acid, on plasma lipids and on the aorta and liver lipid accumulation in hypercholesterolemia experimentally induced in rats, are reported in the following tables:

Effect of free and polmer-bound nicotinic acid on rat aorta cholesterol.

| Conditions | Cholesterol (μg % total lipids) |
|---|---|
| Control | 5.21 |
| Diet | 6,42 |
| Mic. Ac. | 5.97 |
| P61 | 4.53 |

The animals were on hypercholesterolemic diet for 14 weeks.
At 9th week they were also treated with drugs (each value is meant of 3 animals).

From the above data it is deduced that the polymer P61 has a much more marked effect in decreasing aorta cholesterol levels, than free nicotinic acid. On the other hand the tests performed on liver have shown that the polymer P61 affords some protection to liver from cholesterol; while nicotinic acid has a negative effect.

The same conclusions may be drawn in respect to triglycerides in liver. It may be that the negative effect of nicotinic acid on liver is due to the rebound phenomenon which, as it has been already seen, does not exist with P61 treatment.

Effect of free and polymer-bound nicotinic acid on liver cholesterol after 5 weeks of hypercholesterolemic diet

| Conditions | μg/100 mg Tissue |
|---|---|
| Control | 466.26 |
| Diet | 956.18 |
| Nic. Ac. | 1277.45 |
| P61 | 806.37 |

Effect of free and polymer-bound nicotinic acid on liver triglycerides after 5 weeks of hypercholesterolemic diet.

| Conditions | μg/100 mg Tissue |
|---|---|
| Control | 114.63 |
| Diet | 498.01 |
| Nic. Ac. | 1536.93 |
| P61 | 727.29 |

In conclusion P61 releases nicotinic acid slowly to the gastrointestinal tract, so that a low blood level of the pharmacologically active form would be maintained over a prolonged period, avoiding the very high peak levels for a short duration, followed by a rapid decline, as occurs after the administration of free nicotinic acid.

This new polymer has thus been shown to be free of the many undesired side effects and toxicity effects produced by free nicotinic acid, and to possess the same activity over an extremely longer period of time.

According to the invention, the new polymers can be administered orally as well as intravenously in any appropriate formulation.

To make clearer the processes for preparing the polymers according to this invention, we give below some examples that have the purpose of merely illustrating this aspect of the invention:

EXAMPLE 1

(a) A suspension formed of 18 g nicotinoyl chloride-hydrochloride finely dispersed in 350 ml of pure anhydrous chloroform is slowly added to a solution of 20 grams imidazole in 200 ml pure and anhydrous chloroform; temperature is maintained between −5° and 0° C. by outer cooling.

Once the addition is finished the mixture is left to rest under agitation for 12 hours; then it is filtered and the solvent is made to evaporate under vacuum at 40° C. The residue is crystallized by cooling and crystallized again from anhydrous n-heptane. Yield 10 g (58%) of nicotinoyl imidazolide, m.p. 62° C.

(b) To 17.3 g of poly-1-acryloylbenzotriazole (prepared for example according to P. Ferruti, A. Fere e G. Cottica, J. Polymer Sci., Pol.Chem.Ed. 12, 553 (1974)) dissolved into 150 ml of anhydrous N,N-dimethylformamide, 18.5 g of ethanolamine are added under stirring. Agitation is continued for 24 hours at room temperature. The reaction raw product is then poured into 500 ml ether; the precipitate is then dissolved in a little quantity of anhydrous methanol and then precipitated again with excess of ether. This operation is repeated and the polymer thus obtained is dried until constant weight at ambient temperature and at 0.1 mmHg. Yield 11 g, (96%).

(c) The previous polymer is dissolved in 100 ml N,N-dimethylformamide; to the mixture 18 g of nicotinic acid imidazolide are added. It is stirred until the solution is homogeneous and the reaction container is let to rest for 24 hours in a thermostatic bath at 65° C. After this time has elapsed, the reaction mixture is poured into ether, then the precipitate is dissolved in chloroform and it is reprecipitated with excess of ether thus obtaining 17 g (96%) of a polymer having the formula (I)

EXAMPLE 2

By operating as said in the first example, the treatment is made of 17.3 g poly-1-acryloylbenzotriazole dissolved in 150 ml of N,N-dimethylformamide with 48.6 g N,N-bis (2-hydroxyethyl)-1,3-propandiamine.

The product is isolated by pouring the reaction raw product into 1 liter of acetone and is purified as said before. Yield 20 g (92.5%).

Operating then as under Example 1, 20 g of polymer so obtained are treated with 34.6 g imidazolide of nicotinic acid, isolating therefore, as described under Example 1, 35.85 g of polymer having formula:

(II)

EXAMPLE 3

Operating exactly as described under Example 1 17.3 g of poly-1-acryloylbenzotriazole and 25 g of ethylendiamine are reacted. The product is isolated as described under Example 1. Yield 10.5 g (92%). The polymer so obtained is treated under the same conditions of Example 1 with the same quantity of imidazolide of nicotinic acid and isolated in the same way. Yield 19 g (96%) of one polymer having the formula:

(III)

EXAMPLE 4

A mixture of 57 g ethyl nicotinate and 230 ml of ethylenediamine is made to reflux for 12 hours.

The excess of ethylenediamine and the ethyl alcohol thus formed are made to evaporate under vacuum; the residue is treated with anhydrous ether, thus obtaining 55.98 g (90%) of β-amino ethyl nicotinamide, melting point 54° C. 16.5 g of the previous prepared product are dissolved in 100 ml of anhydrous chloroform and 11.57 cc of triethylamine are added; the resulting mixture is added dropwise to a solution of 10.5 g of methacryloyl chloride in 50 cc of chloroform, maintaining the temperature between 0° and 5° C. with outer cooling. Once the addition is finished it is left to rest under agitation for two hours at room temperature, then it is extracted three times in a separating funnel with portions each of 100 cc of a water solution of 20% NaCl; the chloroform phase is the separated; it is dried on Na₂SO₄, the solvent is made to evaporate and the residue is crystallized again from benzene, eliminating by warm filtration the traces of triethylamine hydrochloride that might still be present. Thus 11 g of (β-nicotinamidoethyl) methacrylamide, melting point 139° C., are obtained.

10 g of the previously prepared product are dissolved in 70 cc of pure methanol; 10 mg of azobisisobutyronitrile are added and after eliminating the air by repeated evacuations and inlets of argon, the mixture is maintained under argon atmosphere in a thermostatic bath at 60° C. for 24 hours.

Once this time has elapsed, the reaction mixture is poured into 500 ml of ether, thus obtaining 9.7 g (97%) of a polymer having the formula:

EXAMPLE 5

(a) To a solution of 77 ml of acryloyl chloride in 350 ml of anhydrous toluene, 85.1 ml of N-methyl piperazine and 145 of triethylamine in 750 ml of anhydrous benzene are slowly added under agitation, while maintaining the temperature between −5° and 0° C. by outer cooling.

This addition finished, 0.5 g of tert.-butyl catechol are added and the mixture is left under agitation at room temperature for one hour. The reaction mixture is then filtered; solvents are eliminated by evaporation at 40° C. and 15 mm Hg and the residue is distilled; boiling point 100°–105°/0.4 mm Hg. Thus 57 g (50%) of 1-acryloyl 4-methyl piperazine are obtained.

(b) Copolymers between acryloyl benzotriazole and 1-acryloyl-4-methyl piperazine have been prepared by dissolving the two monomers in the desired ratio into a proper solvent (for example dioxane), by adding a radical initiator (for example azobisisobutyronitrile) and by maintaining the mixture under inert atmosphere at 40°–80° C. over 12–24 hours. Copolymers are then isolated by dissolving the reaction mixture with excess of n-heptane.

These copolymers have been then treated with ethanolamine and thereafter with imidazolide of nicotinic acid, in a way quite similar to that described under Example 1, thus obtaining copolymers between I and 1-acryloyl-4-methyl piperazine.

In another case if we treat with N,N-bis(2-hydroxyethyl)1.3-propanediamine and then operate as specified under Example 2 the corresponding copolymers between II and 1-acryloyl-4-methyl piperazine are obtained.

In a similar way, by treating with ethylenediamine and proceeding as indicated under Example 3 copolymers of III are obtained.

By starting from copolymers between 1-acryloyl benzotriazole and N-acryloyl morpholine or N-vinylpyrolidone, that can be obtained in a way entirely similar to that mentioned above in the case of the 1-acryloyl-4-methyl piperazine, but replacing such monomers for the 1-acryloyl-4-methyl piperazine, and then operating as described in detail in the preceding paragraph, the copolymers between I, II or III and N-acryloylmorpholine or N-vinyl pyrolidone are obtained.

It is deemed surperfluous to describe in particular the preparation of the above mentioned copolymers because the details given here and the description of Examples Nos. 1, 2 and 3 make it obvious for a man skilled in the art to prepare these products.

Copolymers between V and 1-acryloyl-4-methyl piperazine, N-acryloyl morpholine or N-vinylpyrolidone have been obtained directly from (β-nicotinamidoethyl) methacrylamide and those monomers, by radical copolymerisation in proper solvents such as methanol or dioxane, and isolating the products by precipitation with excess of ether.

EXAMPLE 6

To a solution of 17.3 g of poly-1-acryloyl benzotriazole in 170 ml of pure and anhydrous chloroform, 22 g of mononicotinate of ethylene glycol and 15 g of triethylamine are added. The mixture is left to rest for 24 hours at 60° C. in an inert gas atmosphere. After this time, the product is made to precipitate by dilution with excess of ether and then it is filtered and dried at room temperature and 0.1 mm Hg.

Thus 22 g (99.5%) of poly (β-nicotinoyloxyethyl)acrylate are added, having the formula Copolymers between β-nicotinoyloxyethyl acrylate and 1-acryl-4-methyl piperazine, N-acryloyl morpholine or N-vinylpyrolidone are obtained by following the same procedure but starting from corresponding copolymers of 1-acryloylbenzotriazole obtained as described under Example 5.

EXAMPLE 7

A solution of 19.424 g of 1,4-bisacryloyl piperazine (prepared according to F. Danusso, P. Ferruti and G. Ferroni, Chimica e Industria 49, 271 (1967)) plus 14; 821 g of N,N'-bis- hydroxyethylethylendiamine in 250 ml of pure methanol is left to stay at room temperature for 72 hours.

After this time the reaction mixture is diluted with excess of ether, thus separating 34 g (99.3%) of polymers having this formula:

To a solution of 34 g of the polymer in 250 ml of pure and anhydrous chloroform, 50 ml of triethylamine are added and then slowly by little portions under agitation 45 g of finely powdered nicotinoyl chloride hydrochloride are also added. This addition finished, 40 ml of triethylamine are further added and left to stay while agitating for 8 hours.

The mixture is diluted with additional 200 ml of chloroform and the solution extracted four times with portions of 350 ml each of a water solution of 10% sodium chloride.

The chloroform phase is filtered and dried on anhydrous potassium carbonate; after separating the latter, the product is precipitated by dilution with large excess of ether.

The product is then dried at room temperature and 0.1 mm Hg. Thus 48.5 g (88%) of a polymer are obtained, having this formula:

(IX)

EXAMPLE 8

A mixture consisting of 20 g of dextran (commercial product B.D.H. having average molecular weight in the range of 200.000 and 275.000), of 100 g nicotinoyl chloride hydrochloride and 500 ml pyridine is refluxed under stirring until a clear solution is obtained.

This solution is cooled, poured into excess of distilled water and the solid product precipitated is separated by filtration. This product is then purified by dissolution in chloroform and re-precipitated with excess of ether, thus obtaining 42 g (67.9%) of dextran where all of the free hydroxyls that were initially present have been esterified with nicotinic acid.

EXAMPLE 9

A soluble starch was used having a polymerization degree (means value) around 1,500 and containing 20% of amylose and 80% of amylopectine.

The characteristics of pH, reducing substances with the Fehling reactive, loss of weight by drying and ash content were those prescribed by the Italian Official Pharmacopeya VIII Ed., 1972.

To a solution obtained by warming 21.19 g of this soluble starch in 220 ml of strictly anhydrous dimethylsulphoxide, 11.5 g of 1-nicotinoylimidazole were added.

The reaction mixture was then kept at 60°±0.1° under an inert atmosphere for 24 hours. The product was isolated by pouring the DMSO solution into a large volume of a 1:1 ether/acetone mixture, washing the precipitated polymers with acetone, dissolving in 250 ml of 3% aqueous hydrochloric acid, and reprecipitating into an excess of acetone. Pure polymer was finally obtained by dissolving twice the crude product in pure water, and reprecipitating with acetone. After drying at room temperature and 0.01 mm Hg the yield was 22 g. Analysis: found N 2.14%.

This value closely approaches the nitrogen content of a starch having one nicotinoyl residue—as the hydrochloride—over 3 glucosidic units, that is a 23–25% by weight of nicotinic acid residues.

A number of analogous polymers were prepared by using different soluble starchs having a degree of polymerization included between 150 and 2,500 and having an amylose content between 15 and 35%, the remainder being amylopectine.

The process of preparation of the polymers containing nicotinic acid residues was identical to that just described.

We claim:

1. Polymers characterized in that they consist of a soluble starch macromolecular structure to which 15–30% by weight of nicotinic acid radicals are bound through covalent ester bonds, which polymers are gradually hydrolyzed in biological evironment by setting free nicotinic acid and non-toxic polysaccharide residues.

2. A Process for preparing polymers as defined in claim 1, wherein soluble starch is reacted with 1-nicotinoylimidazole in the presence of an anhydrous organic solvent under an inert gas atmosphere.

3. A process according to claim 2, wherein the organic solvent is anhydrous dimethylsulphoxide and the reaction is performed at a temperature of about 60° C.

4. A process according to claim 3, wherein the product is precipitated by pouring the dimethylsulphoxide solution into a large volume of a 1:1 ether: acetone mixture.

5. A therapeutic composition containing a therapeutically effective amount of a polymer as defined in claim 1.

* * * * *